3,664,812
PURIFICATION OF HYDROGEN PEROXIDE
Ernest B. Hoyt, Syracuse, N.Y., assignor to Allied
Chemical Corporation, New York, N.Y.
No Drawing. Filed Mar. 16, 1970, Ser. No. 20,041
Int. Cl. C01b 15/02; C07c 49/68
U.S. Cl. 23—207                                    9 Claims

ABSTRACT OF THE DISCLOSURE

A method for purifying aqueous acidic solutions of hydrogen peroxide prepared by an organic anthraquinone process which comprises the addition to said solution of an oxide or hydroxide of magnesium, calcium, or barium either as a solid or as an aqueous solution in an amount to raise the pH of the solution to about 6 to 8.5 to effect precipitation of the impurities and recovering an essentially pure, stable hydrogen peroxide solution.

---

This invention relates to the purification of aqueous hydrogen peroxide solutions, particularly those crude hydrogen peroxide solutions obtained from the organic process involving the alternate oxidation and reduction of an alkylated anthraquinone, such as 2-ethyl anthraquinone, as described in U.S. Pat. No. 2,995,424.

The hydrogen peroxide formed in the oxidation stage of processes of the above type is generally separated by extraction with water from the oxidized working solution before the latter is recycled to the hydrogenation stage. Such processes produce hydrogen peroxide efficiently, but the crude aqueous hydrogen peroxide extracts obtained are contaminated with objectionable amounts of entrained and dissolved constituents of the working solution, such as organic impurities, inorganic metal salts, and mixtures of said organic and inorganic impurities produced by decomposition of the solvents and other organic compounds employed in the system.

The presence of these impurities has been of great concern to producers of hydrogen peroxide since they catalyze decomposition of said hydrogen peroxide to produce water and oxygen, particularly when the temperature, pH, concentration of the hydrogen peroxide solution or of the impurities is raised. Although the organic impurities are undesirable since they impart color and odor to the product, it has been determined that it is the metallic impurities which catalyze the decomposition, even when present in minute quantities. It has also been found that iron is the chief offender. Of the several inorganic impurities present in crude aqueous hydrogen peroxide solution, iron is generally present in the greater amount, contributed in part by erosion of the equipment employed after the glass lining has chipped. For these reasons, special precautions must be taken in the concentration of the crude aqueous hydrogen peroxide solutions. Such concentration is of importance since hydrogen peroxide produced by the organic anthraquinone process has a concentration of only about 10 to 50%, while eventually it frequently must be stored and shipped at concentrations in the order of 50 to 90% or even higher. Even where it is desired to ship and use the hydrogen peroxide at the lower concentration at which it is produced initially, the impurities must be removed in order to provide the stability required for safe and economic handling and storage. Many methods for purifying crude hydrogen peroxide solutions can be found in the prior art, but they do not reduce the contaminating metallic ions sufficiently to bring about the degree of stability desired and/or they introduce foreign cations into the system.

Recently, U.S. Pat. 3,353,913 issued and discloses the purification of hydrogen peroxide by first adding a flocculating agent comprising a metal salt, such as aluminum sulfate, to the aqueous hydrogen peroxide solution maintained at a pH below 5 and then raising the pH of the solution to about 5.6–7.5 by the addition of either ammonium hydroxide, sodium hydroxide, potassium hydroxide or anhydrous ammonia. A gelatinous precipitate of aluminum hydroxide is formed which carries with it insoluble hydroxides of the metallic impurities that were present in the hydrogen peroxide solution. One disadvantage of this method is the permanent introduction into the aqueous hydrogen peroxide of the cation of the base used. When, for example, ammonium hydroxide is used as the precipitant, none of the ammonium ion that has been introduced into the hydrogen peroxide is removed by the purification step because of the high solubility of the ammonium salts, e.g. ammonium phosphate, in the hydrogen peroxide solution. As a result, the ammonium ion concentration must build up in the distillation unit to an unacceptably high level. Some means of purging this ammonium salt must be found, such as discarding some of the distillation residues with the consequent loss of hydrogen peroxide. Another approach would be to cool these residues then filter them to remove the precipitated ammonium salts, thus introducing an additional treatment step. Furthermore, the aluminum hydroxide precipitate which forms is relatively difficult to filter. The primary failing of the above-described procedure and the other purification methods of the prior art is that the quantity of iron and other metallic ions remaining in the solution prevent a high degree of stability in the final purified hydrogen peroxide solution produced.

It is the object of this invention to provide a process which is both practical and economically feasible, for the production of a purified aqueous hydrogen peroxide solution having exceptional stability over a wide range of hydrogen ion concentrations and temperature, without the introduction of undesirable cations. It has been found quite surprisingly that a hydrogen peroxide solution containing less than 0.02 and preferably about 0.01 or less, milligrams per liter of iron and virtually no detectable quantities of other heavy metals can be obtained by treating an aqueous hydrogen peroxide solution at a pH within the range of about 0.5 to 5 with the oxide or hydroxide of calcium, barium, or magnesium as a solid, or preferably as an aqueous slurry, in an amount sufficient to raise the pH of the solution to 6.0 to 8.5. By employing this procedure, a flocculant, easily filterable precipitate is formed carrying with it the iron and other metallic salts present in the solution. The purified hydrogen peroxide solution produced has been found to have exceptional stability, and the amount of cation introduced by the chosen precipitants is minimal, not requiring any special handling or treating step to remove.

In the preferred embodiment of this invention, phosphoric or sulfuric acid is added to the crude hydrogen peroxide solution prepared by the organic process from anthraquinone in an amount sufficient to bring the pH of the solution to about 0.5 to 5.0. To this solution is added either the oxide or hydroxide of calcium or barium in an amount sufficient to raise the pH of the solution to 6.0 to 8.5. Magnesium oxide or hydroxide may be similarly employed, if being limited to those instances where phosphoric acid is used, since the use of sulfuric acid would give a water soluble magnesium sulfate. A precipitate is formed carrying with it the iron and other metallic impurities so that the inorganic contaminants are reduced to a concentration of about 0.02 or less milligrams per liter of iron, and essentially no detectable quantities of other metals. The iron and other heavy metals are converted to an insoluble state, and at the same time a calcium or barium, phosphate or sulfate floc, or a magnesium phosphate floc is formed, which adsorbs the insoluble impurities.

In the preferred procedure, phosphoric acid is used to bring the pH of the crude hydrogen peroxide solution to about 0.5 to 5. Phosphoric acid is most commonly used to adjust the pH of the purified hydrogen peroxide solution since it has a stabilizing effect on active oxygen compounds in addition to its acidifying action. Preferably, the oxide or hydroxide of calcium is used because of its ready availability at low cost, either as lime (CaO) or milk of lime ($Ca(OH)_2$), with milk of lime being especially preferred. The milk of lime is generally added slowly with stirring to the solution over a period of at least 5 minutes, in an amount sufficient to raise the pH of the solution to 6.0 to 8.5. The flocculant, easily filterable precipitate of calcium phosphate which will have adsorbed the undesirable metallic impurities is then removed by filtration quickly and easily. The hydrogen peroxide produced by this procedure has exceptional stability and a minimum of cation has been introduced by the chosen precipitant. The unusually high stability is a result of the reduction of catalytic metals in the peroxide.

In a variation of this invention, sulfuric acid may be used in place of phosphoric acid to bring the pH of the crude hydrogen peroxide solution to a point between 0.5 and 5 and then adding barium hydroxide, such as in the form of a slurry, to raise the pH to between 6 and 8.5, to precipitate barium sulfate rather than calcium phosphate. In the case of the preferred embodiment, or in the variation just described, the metal salts present as impurities are converted to an insoluble condition and adsorbed by the precipitate, thereby facilitating their physical removal from the solution.

In the preferred embodiment of this invention, a quantity of phosphate ion is introduced to bring the total content to between 5 and 3,500 milligrams per liter of the solution being treated, to lower the pH of the solution to 0.5–5.0. The phosphate ion may be introduced as the acid or an acid salt of phosphoric acid. The pH of the solution is then adjusted to 6.0 to 8.5 by the addition of milk of lime. The resulting precipitate containing the adsorbed metallic impurities is physically separated by filtration or other means to provide a purified hydrogen peroxide containing not more than about 0.02, preferably 0.01 milligram or less of said inorganic metallic ions.

The resulting purified aqueous hydrogen peroxide solution may then be treated by addition of an acid to lower the pH to any point desired. Useful acids include phosphoric, sulfuric and other hydrogen peroxide-compatible acids, with phosphoric acid being especially preferred. The acid, however, should not act to decompose the hydrogen peroxide, e.g. hydrochloric.

The herein process preferably is carried out at ambient temperatures, i.e. at about 15° to 25° C. At elevated temperatures the stability of hydrogen peroxide decreases, particularly in the presence of impurities, so that it is not desirable to operate above about 25° C. Furthermore, there is nothing to be gained by refrigerating the system for processing below 15° C. It is possible, however, to carry out the process at any temperature between the boiling and freezing point of the solution provided the normal decomposition of the hydrogen peroxide at elevated temperatures can be tolerated.

Simple mixing procedures can be employed to carry out the process of this invention, there being no need to employ special mixing equipment. For instance, a mixture of crude hydrogen peroxide and calcium hydroxide is simultaneously introduced into the reaction zone at a rate such that the pH of the mixture is maintained between 6.0 and 8.5 while simultaneously withdrawing from the reaction zone a slurry of purified hydrogen peroxide and precipitate. Removal of the precipitate can be effected by ordinary physical separation methods such as filtration, centrifugation, and the like.

It is particularly surprising that the present process operates to improve stability of aqueous hydrogen peroxide solutions by removal of impurities therefrom, without itself effecting substantial decomposition of the sensitive active oxygen compound. Hydrogen peroxide is known to be especially susceptible to decomposition at pH's in the order of 6 and above, yet the process of this invention successfully operates by raising the pH of the aqueous hydrogen peroxide solution to 6 or higher. However, as will be shown hereinafter in the working examples, the present process acts to remove impurities from aqueous hydrogen peroxide solutions effectively to produce an unusually stable hydrogen peroxide product even at these high pH levels.

The hydrogen peroxide treated by the process of this invention when derived from an organic process usually contains catalytic inorganic impurities in amounts up to 75 mg./liter (approx. 75 p.p.m.), a very large proportion of which are salts of iron. Other metallic ions, among them chromium, copper and manganese, may be present, and all have a deleterious effect on the hydrogen peroxide, particularly at elevated temperatures and high pH values.

The hydrogen peroxide treated by the present process normally has a concentration of about 10 to 50% or higher; such as the process described in U.S. Pat. Nos. 2,966,398 and 2,995,424. Hydrogen peroxide at these, and even higher concentrations, can be treated by the present process to provide a purified stable product. The hydrogen peroxide may pick up metallic impurities on storage, and the present process can be used effectively to remove these acquired impurities.

The process of this invention is illustrated by the following examples in which all percentages and parts are by weight unless otherwise indicated. All values expressed as parts per million (p.p.m.) are based upon the weight of the peroxide solution.

EXAMPLE 1

A crude aqueous hydrogen peroxide solution produced via the anthraquinone process, as described in U.S. Pat. No. 2,995,424, has a pH of 1.6 and contains 13% hydrogen peroxide before distillation. It contains 0.46 milligram per liter (0.44 p.p.m.) of iron and 3,228 mg./l. of phosphate ion. The stability measures 9.0% loss of hydrogen peroxide at 100° C. in 16 hours. Milk of lime, containing 300 grams per liter of calcium hydroxide, is added drop by drop to 1300 milliliters (ml.) of this hydrogen peroxide solution at room temperature while stirring to bring the pH of the solution to 8.0. A precipitate of calcium phosphate starts to form in the hydrogen peroxide solution at a pH of about 5, and continues to increase until the final pH of 8.0. After 5 minutes additional stirring, the finely divided white precipitate coagulates in a coarse floc. This precipitate is easily vacuum filtered to give a clear aqueous hydrogen peroxide solution. The pH of this solution is then lowered to 6.0 with phosphoric acid. The iron content is then found to be less than 0.01 mg./l. (0.01 p.p.m.), while the stability at 100° C. shows 1.6% loss in 16 hours.

EXAMPLE 2

A crude aqueous hydrogen peroxide solution is prepared as in Example 1 from an anthraquinone process and has a concentration of about 13% hydrogen peroxide and a pH of 4.1. Milk of lime is added, as above, to raise the pH of the solution to 8.0 at room temperature. After 5 minutes stirring, the solution is vacuum filtered. The phosphate ion content of the treated solution is 192 mg./l. in comparison to an original phosphate ion content of 947 mg./l. The pH of a portion of the purified solution is then lowered to 6.0 with phosphoric acid. The iron content drops from 0.20 mg./l. (approx. 0.20 p.p.m.) in the original solution to 0.01 mg./l. (.01 p.p.m.) in the treated solution. Also, the stability improves from 9.9% decomposition in the original solution at a pH of 4.1 to 6.6% decomposition in the treated solution at pH 6.0.

A second portion of the purified solution in which the pH is dropped to 2.1 shows only 2.3% decomposition. All stability tests are carried out at 100° C. for 16 hours.

EXAMPLE 3

A volume of crude aqueous hydrogen peroxide from the same source as that used in Examples 1 and 2 is treated in the same manner, except that no further pH adjustment is made after filtration. At a pH level of 8.0 this purified sample has an iron content of 0.01 mg./l. (0.01 p.p.m.) and 120 mg./l. of phosphate ion. The stability test results in only a 3.6% loss of active oxygen in 16 hours at 100° C. even though measured at pH 8.0.

EXAMPLE 4

A volume of crude aqueous hydrogen peroxide similar to that used above is treated with only enough milk of lime to raise the pH of the solution to 6.0. After stirring for 5 minutes a small precipitate collects into a coarse floc and is vacuum filtered. The iron content is again reduced to 0.01 mg./l. (0.01 p.p.m.), and the phosphate ion to 853 mg./l., while the stability test shows a loss of 7.9% of the active oxygen after 16 hours at 100° C. at pH 6.0.

EXAMPLE 5

One ml. of concentrated phosphoric acid is added to one liter of aqueous hydrogen peroxide solution of 28% concentration (Portion I), containing only a small amount of phosphate ion (34 mg./l.), to give an estimated phosphate ion concentration of 1,400 mg./l. The solution is then divided into two equal portions (Portions II and III). The pH of Portion II is raised to 7.7 with the addition of 2.9 ml. of the milk of lime, while Portion III is raised to a pH of 7.3 by adding 2.3 ml. of the milk of lime. After 1½ hours standing, the precipitates are filtered. The clear solutions are adjusted to a pH of 6.0 with phosphoric acid and then analyzed. The data are tabulated below:

| Portion number | pH to ppt. | Final pH | Fe, mg./l. | PO₄, mg./l. | Stability ª (percent loss) |
| --- | --- | --- | --- | --- | --- |
| I | | 1.9 | 0.25 | ᵇ 34 | 95.0 |
| II | 7.7 | 6.0 | 0.02 | 496 | 4.4 |
| III | 7.3 | 6.0 | 0.02 | 167 | 2.5 |

ª After 16 hours at 100° C.
ᵇ Original solution before adding $H_3PO_4$. (0.7 pH units have been added to all Beckman pH meter readings in these examples. See "The Behavior of the Glass Electrode in Hydrogen Peroxide Solutions." J.A.C.S. 79, 531 (1957).)

EXAMPLE 6

Three portions of a crude aqueous hydrogen peroxide solution, (13%) containing phosphate ions and 0.17 mg./l. of iron, are each treated by the slow addition of milk of lime slurry until the pH of the solutions reaches (I) 7.5; (II) 8.0; and (III) 8.5, respectively. After 5 minutes of stirring each slurry is vacuum filtered. The analytical results are tabulated below:

| Portion number | pH | Fe, mg./l. | Ca, mg./l. | PO₄, mg./l. |
| --- | --- | --- | --- | --- |
| I | 7.5 | <0.01 | 39 | 339 |
| II | 8.0 | <0.01 | 59 | 84 |
| III | 8.5 | <0.01 | 380 | 6 |

These data illustrate the high efficiency of iron removal at all three pH values. Also, the minimum combined calcium and phosphate values are at a pH level of 8.0. The small residual calcium content at pH 7.5 or 8.0 holds important implications for the concentration operation, where purging rates from the reaction zone become important. Also, at a pH level of 8.5 it is noted that a high concentration of residual calcium cations remain in the peroxide solution.

EXAMPLE 7

Barium hydroxide octahydrate crystals are ground in a mortar and slurried with water. This slurry is added slowly with agitation to two samples of a 13% crude aqueous hydrogen peroxide solution containing 947 mg./l. of phosphoric acid as PO₄, until the pH reaches 7.0 (Portion I) and 8.0 (Portion II), respectively. The precipitates are removed by filtration and samples of the resulting solutions are then analyzed for phosphate ion before adjusting their pH levels to 6.0 for iron and stability tests. The analytical results are as follows:

| Portion number | PO₄ | | Fe | | Stability (percent loss) | |
| --- | --- | --- | --- | --- | --- | --- |
| | pH | Mg./l. | pH | Mg./l. | pH | Percent |
| Control | 4.0 | 947 | 4.0 | 0.20 | 4.0 | 9.9 |
| I | 7.0 | 356 | 6.0 | 0.02 | 6.0 | 4.0 |
| II | 8.0 | 253 | 6.0 | 0.02 | 6.0 | 4.1 |

EXAMPLE 8

To 500 ml. of a 13% crude aqueous hydrogen peroxide solution having a pH of 2.7 and containing no sulfate ion, there is added 0.41 ml. of concentrated sulfuric acid to give about 1,400 mg./l. of sulfate ion, and bring the pH of the hydrogen peroxide solution to 1.6. Sufficient ammonium hydroxide is then added to the solution to raise the pH to 2.7. Finely ground barium hydroxide octahydrate (1.0 g.) is added to the hydrogen peroxide solution with agitation. After 15 minutes the pH rises to 6.6 with the formation of a precipitate which is filtered off to give a clear hydrogen peroxide solution. Finally, the pH of this solution is adjusted to 2.7 with phosphoric acid. Analysis shows that the solution contains 0.02 mg./l. iron vs. 0.70 mg./l. iron for the original solution. The stability improves from 37.7% loss of active oxygen in 16 hours at 100° C. and a pH of 2.7 to 4.4%.

EXAMPLE 9

Each of three samples of a crude aqueous hydrogen peroxide solution, having a pH of 3.3, an iron content of 0.48 mg./l., a PO₄ ion value of 896 mg./l. and containing 122.3 grams per liter of hydrogen peroxide, are treated with sufficient milk of lime to raise the pH to (1) 6.5; (2) 7.5; and (3) 8.5, respectively. After filtration to give clear solutions of hydrogen peroxide, the samples are titrated to determine the hydrogen peroxide concentration. The data are shown in the table below.

$H_2O_2$ LOSSES

| Treatment (pH) | $H_2O_2$ concentration grams per liter | | | Loss in percent |
| --- | --- | --- | --- | --- |
| | Initial | Final | Loss | |
| 6.5 | 122.3 | 121.7 | 0.6 | 0.49 |
| 7.55 | 122.3 | 121.1 | 1.2 | 0.98 |
| 8.5 | 122.3 | 121.4 | 0.9 | 0.74 |

These data show that the entire purification operation leads to hydrogen peroxide losses of less than 1% even at pH's as high as 8.5.

The novel characteristics and unexpected advances of the present invention may be enumerated as follows:

(1) Iron and other heavy metal impurities can be reduced to an unusual low level.

(2) The present process provides hydrogen peroxide of remarkable stability even in a pH range in the order of 6.0–8.5 where normally it is quite susceptible to decomposition. Even higher stabilities can be achieved by reducing the pH below 6 by the addition of phosphoric acid. Such improved stability represents an advance over prior art.

(3) The present process eliminates to a substantial degree the presence of the cation in the treated peroxide solution (Example 7), so that even in the subsequent distillation step, recycling a small purge from the distillation vessel to the purifying operation will keep the cation to a very low level.

(4) An additional attractive feature and surprising result of the present invention is the ease and speed at which the insoluble phosphate floc is filtered, saving in production cost.

(5) The method of the present invention renders any subsequent distillation for hydrogen peroxide concentration safer.

(6) The present process provides a product of improved purity and stability and eliminates the need for double distillations where previously required.

I claim:

1. A process for purifying a crude acidic hydrogen peroxide solution prepared by an organic anthraquinone process, which comprises treating said aqueous solution having a pH within the range of 0.5 to 5.0 and at a temperature between its freezing point and melting point with an oxide or hydroxide of an element selected from the group consisting of calcium, barium, and magnesium in an amount sufficient to raise the pH of the solution to a level of 6.0 to 8.5 and form a precipitate and separating the treated hydrogen peroxide solution from said precipitate.

2. The process of claim 1 wherein the pH level of the crude acidic peroxide solution prior to addition of the additive is adjusted to 0.5 to 5.0 with an acid selected from phosphoric and sulfuric.

3. The process of claim 1 wherein the oxide or hydroxide is calcium oxide.

4. The process of claim 1 wherein the oxide or hydroxide is calcium hydroxide.

5. The process of claim 1 wherein the oxide or hydroxide is barium hydroxide.

6. The process of claim 1 wherein the pH level of the treated hydrogen peroxide solution is reduced to below 6 by the addition of an acid selected from phosphoric and sulfuric.

7. The process of claim 1 wherein the treated hydrogen peroxide solution has an inorganic metallic ion level of no more than 0.02 milligram per liter.

8. The method of claim 1, in which the oxide or hydroxide is introduced while maintaining the temperature of the solution between 15° and 25° C.

9. A process of removing inorganic metal salts from a crude aqueous acid solution of hydrogen peroxide having a pH between 0.5 and 5.0 containing phosphate ion, and impurities from the group consisting of inorganic metal ions, organic impurities which derive from work solutions used in the production of hydrogen peroxide by an organic anthraquinone process and mixtures of said inorganic impurities comprising treating said solution at a temperature between its boiling point and freezing point by the simultaneous introduction into a reaction zone of a mixture comprising the crude hydrogen peroxide and calcium hydroxide at a rate such that the pH of the mixture is maintained between 6.0 and 8.5, while simultaneously withdrawing from the reaction zone a slurry, after providing a minimum holding time in said reaction zone of at least 5 minutes, and separating a purified hydrogen peroxide containing no more than 0.02 milligram per liter of said inorganic metallic impurities from the removed slurry.

References Cited

UNITED STATES PATENTS

| | | | |
|---|---|---|---|
| 1,210,651 | 1/1917 | Jahl | 23—207 |
| 2,027,839 | 1/1936 | Reichert | 23—207 |

OSCAR R. VERTIZ, Primary Examiner

H. S. MILLER, Assistant Examiner

U.S. Cl. X.R.

260—369